(12) United States Patent
Cheng et al.

(10) Patent No.: US 8,937,805 B2
(45) Date of Patent: Jan. 20, 2015

(54) SHEARING MECHANISM FOR CUTTING THROUGH AN ADHESIVE BONDING OF A DIRECT BONDING PANEL

(71) Applicant: Dell Products L.P., Round Rock, TX (US)

(72) Inventors: Chi-Chou Cheng, Taoyuan County (TW); Chung Jen Ho, Taipei County (TW); Kai-Yuan Cheng, Taipei County (TW); Min-Cheng Huang, Taipei County (TW)

(73) Assignee: Dell Products, L.P., Round Rock, TX (US)

( * ) Notice: Subject to any disclaimer, the term of this patent is extended or adjusted under 35 U.S.C. 154(b) by 206 days.

(21) Appl. No.: 13/724,019

(22) Filed: Dec. 21, 2012

(65) Prior Publication Data

US 2014/0177156 A1    Jun. 26, 2014

(51) Int. Cl.
*G06F 1/16* (2006.01)
*G02F 1/1333* (2006.01)

(52) U.S. Cl.
CPC .. *G06F 1/1637* (2013.01); *G02F 2001/133325* (2013.01)
USPC ....... 361/679.27; 455/424; 206/499; 312/221

(58) Field of Classification Search
USPC ............ 455/457, 67.7, 413, 90.2, 557, 556.1, 455/68, 67.11, 424; 206/459.1, 459.5, 433, 206/449, 499, 531; 361/679.27, 679.01, 361/679.56, 679.3, 679.53, 679.46, 679.31, 361/679.38, 679.48, 679.02, 679.4, 679.32, 361/679.33, 679.41, 679.26, 679.37, 361/679.09; 312/223.1, 223.2, 228, 140.14, 312/332.1, 333, 7.2, 215, 219, 221; 345/176, 690, 213, 89, 1.1, 87, 501, 345/520, 204, 156, 633, 589, 211, 177, 172, 345/173
See application file for complete search history.

(56) References Cited

U.S. PATENT DOCUMENTS

2011/0133530 A1 *  6/2011  Chang ........................ 297/217.3
2013/0273944 A1 * 10/2013  Wilson et al. ................. 455/457

* cited by examiner

*Primary Examiner* — Hung Duong
(74) *Attorney, Agent, or Firm* — Isidore PLLC

(57) ABSTRACT

An information handling system display having a first part that includes a display screen and rendering electronics fastened onto a second part to seal the rendering electronics within the display. The first part is bonded onto the second part via an adhesive that forms a bond between the two parts. A shearing mechanism is also disposed within the display with at least one externally exposed end. A pulling force is applied to the at least one externally exposed end in order to cut through the bond when there is a need to separate the two parts from each other.

20 Claims, 9 Drawing Sheets

SHEARING MECHANISM FOR CUTTING THROUGH AN ADHESIVE BONDING OF A DIRECT BONDING PANEL

BACKGROUND

1. Technical Field

The present disclosure generally relates to an information handling system; and more particularly, to a display device of an information handling system having a shearing mechanism that enables separation of adhesive-bonded surfaces of the display device.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One particular example of an information handling system is a relatively new type of laptop computer systems ("laptops") called ultrathins or ultrabooks (ultrabooks are Intel-based ultrathins). For purposes of this disclosure, ultrabooks and ultrathins will henceforth be collectively referred to as ultrathin computing devices.

Ultrathin computing devices are extremely thin devices (e.g., less than 0.8 inches). Just as conventional laptops, ultrathin computing devices include a body to which a display is attached via a movable joint of metal or plastic that allows the display to pivot around the body when opening and closing the devices. Displays that are attached to a body in such a manner are called "hinge-up displays." The displays generally include a display panel to which a liquid crystal display (LCD) screen and a display frame are attached. The displays may also include a camera for video-conferencing, for example, a cabling system for power and data transfer as well as other components.

In conventional laptops, the display panels, the LCD screens, and the display frames are attached to each other via screws. This allows for the camera or camera module, cabling system or the other components to be individually accessible for repair or replacement in case any one of the components should malfunction or become defective.

Due to the small form factor of the ultrathin computing devices, however, the display panels, the LCD screens, and the display frames are not fastened to each other via screws. Instead, adhesives are used. For example, ultrathin computing device displays include a screen cover that is adhesively bonded to the LCD screen. The screen cover is also bonded to the panel via a very high bond (VHB) double-sided tape to encase the LCD screen therein. Displays that are assembled in this manner are referred to as "direct bonding hinge-up displays."

Since the screen covers, the LCD screens and the display panels of the ultrathin computing devices are bonded together, the camera module, cabling mechanism, the other components or anything else that may be within the displays is not accessible without first breaking the bond. Due to the high tensile strength of the VHB tapes, however, attempts at breaking the bond oftentimes lead to damages to the displays. As a result, some repairs that may involve replacing a minor component, for example, often require replacing the entire displays. Replacing an entire display is relatively expensive since the display may cost anywhere from one fifth to one third the price of an ultrathin computing device.

Therefore, what is a needed is a design and method that will allow bonds between display panels and display screens to be broken without damaging the displays.

BRIEF SUMMARY

Disclosed are an information handling system for and a method of enabling post-assembly separation of a first panel and a second panel of a direct bonding panel assembly, such as a display. The method comprises disposing an elongated shearing mechanism at a perimeter edge of a first surface of the first panel. The shearing mechanism extends along a path that is proximate to a selected periphery location of the first surface at which the first surface is sealed together with a second surface of the second panel to create the panel assembly. The shearing mechanism includes at least one end that extends away from a bonding edge of the panel assembly. The method further comprises disposing an adhesive on at least one of (1) the periphery location of the first surface and (2) an opposing periphery location of the second surface; affixing the first surface to the second surface via the adhesive to create the panel assembly, which has an adhesive bond between the first surface and the second surface, with the at least one end of the shearing mechanism extending from a seam in the perimeter edge. The adhesive bond can then be broken by applying sufficient pulling force on the at least one end of the shearing mechanism in at least one of an upward direction relative to the first panel of the panel assembly and a lateral direction towards an outside edge of the panel assembly.

In one embodiment, an opposing end of the shearing mechanism may be affixed to an immovable structure within the first panel such that only one end extends outward from the bonding edge, and the affixed end allows the one end to be utilized to break the adhesive bond along the entire perimeter of the bonding edge.

In another embodiment, the shearing mechanism has a first end and a second end exiting an opening in the panel assembly, and the adhesive bond can be broken individually or simultaneously by applying sufficient pulling force on each of the first end and the second end.

In yet another embodiment, the path of the shearing mechanism is inside of the selected periphery location of the first surface at which the first surface is sealed together. In a further embodiment, the path of the shearing mechanism is outside of the selected periphery location of the first surface at which the first surface is sealed together. In a yet further embodiment, a channel is provided within the first panel. The channel has a volume dimension that accommodates placement of the shearing mechanism therein, and extends around the perimeter of the first panel to create the path of the shearing mechanism.

As one aspect of the disclosure, a pressure-sensitive adhesive is used. The pressure-sensitive adhesive may be an adhesive glue and/or a double-sided very high bond (VHB) tape. As a further aspect of the disclosure, the elongated shearing mechanism is a string with high tensile strength.

As another aspect of the disclosure, the panel assembly is one of a display of an ultrathin computing device, the second panel of the panel assembly includes a liquid crystal display screen and rendering electronics, and the first panel includes a display panel for sealing the rendering electronics within the display.

As yet another aspect of the disclosure, the method further comprises attaching a third panel covering an area of the first panel at which the shearing mechanism extends from the bonding edge, the at least one end of the shearing mechanism is disposed behind the third panel and is accessible when the third panel is removed. In alternate embodiments, the at least one end can be located on one of the first panel or the second panel.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide an information handling system having a display device, and a method of manufacturing the display device with a mechanism that enables a first panel and a second panel of the display device, that are bonded together, to be separated from each other without damages to the display device.

In the following detailed description of exemplary embodiments of the disclosure, specific embodiments in which the disclosure may be practiced are described in sufficient detail to enable those skilled in the art to practice the disclosed embodiments. For example, specific details such as specific method orders, structures, elements, and connections are presented herein. However, it is to be understood that the specific details presented need not be utilized to practice the embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments," or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
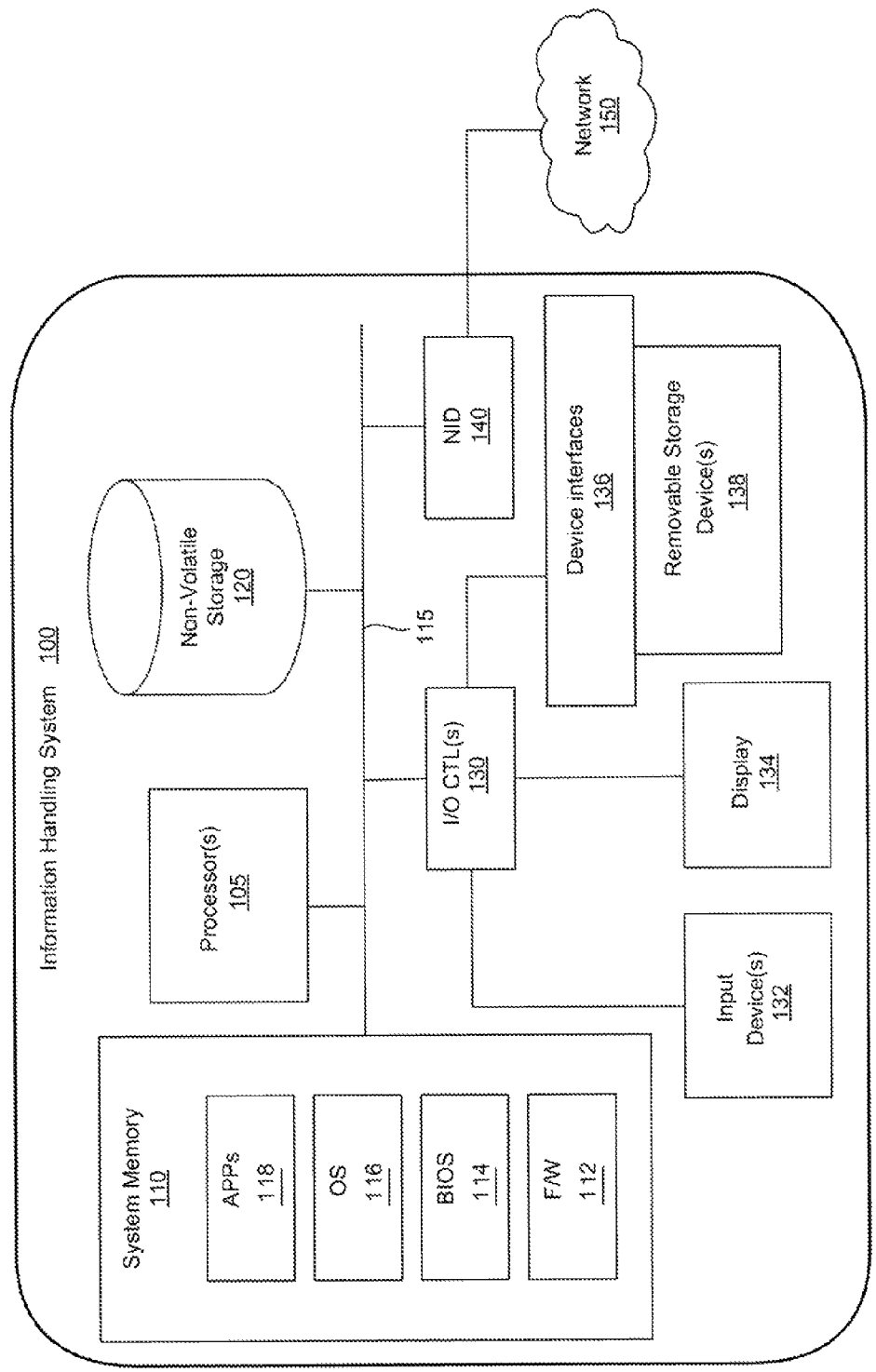
FIG. 1 illustrates an example information handling system within which various aspects of the disclosure can be implemented, according to one or more embodiments.

With reference now to the figures wherein like reference numbers denote like parts, FIG. 1 illustrates a block diagram representation of an exemplary information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, exemplary IHS 100 includes one or more processor(s) 105 coupled to a system memory 110 via system interconnect 115. System interconnect 115 can be interchangeably referred to as a system bus in one or more embodiments. System memory 110 can include therein a plurality of software and/or firmware modules including firmware (F/W) 112, basic input/output system (BIOS) 114, operating system (O/S) 116, and application(s) 118. The one or more software and/or firmware modules within system memory 110 can be loaded into processor(s) 105 during operation of IHS 100.

IHS 100 further includes one or more input/output (I/O) controllers 130 which support connection by and processing of signals from one or more connected input device(s) 132, such as a keyboard, mouse, touch screen, or microphone. I/O controllers 130 also support connection to and forwarding of output signals to one or more connected output devices, such as a monitor or display device 134, a camera, a microphone, or audio speaker(s) (not shown). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. Device interfaces 136 can further include General Purpose I/O interfaces such as $I^2C$, SMBus, and peripheral component interconnect (PCI) buses.

IHS 100 comprises a network interface device (NID) 140. NID 140 enables IHS 100 to communicate and/or interface with other devices, services, and components that are located externally to IHS 100. These devices, services, and components can interface with IHS 100 via an external network, such as exemplary network 150, using one or more communication protocols. Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

Figure 2:
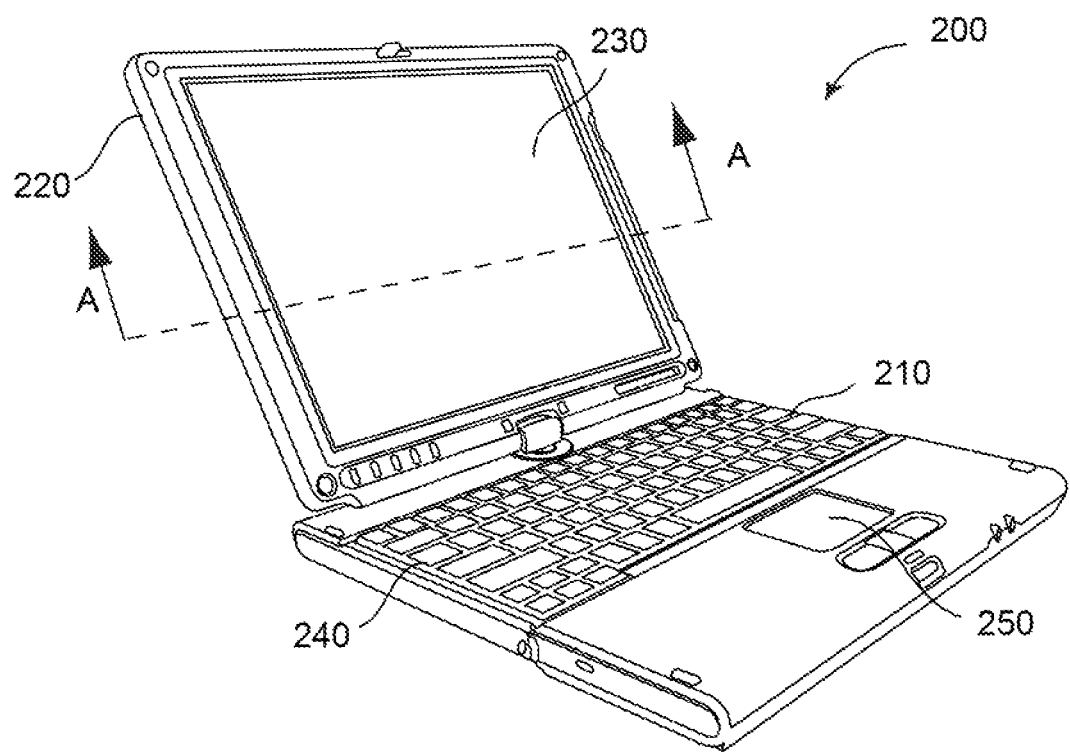
FIG. 2 illustrates an exemplary ultrathin computing device within which various aspects of the disclosure can be implemented, according to one embodiment or more embodiments.

As noted above, a particular example of an information handling system is an ultrathin computing device. FIG. 2 illustrates an exemplary ultrathin computing device 200. Ultrathin computing device 200 includes a body 210 and a display 220. The body 210 and the display 220 are attached to each other via a hinge mechanism (not shown) that allows the display 220 to pivot around the body 210 when opening and closing the ultrathin computing device 200. The body 210 accommodates a keyboard 240 under which CPU(s), RAM, ROM, and solid state drives (SSDs), none of which are shown, can all be located. The body 210 may also include network ports and input devices, such as track pad 250. The display 220 includes a liquid crystal display (LCD) screen 230 under which electronics for rendering images on the screen are located.

Those of ordinary skill in the art will appreciate that the hardware components and basic configuration depicted in FIGS. 1 and 2 and described herein may vary. For example, the illustrative components within IHS 100 and ultrathin computing device 200 are not intended to be exhaustive, but rather are representative to highlight components that can be utilized to implement different aspects of the present disclosure. For example, other devices/components may be used in addition to or in place of the hardware depicted. The depicted example does not convey or imply any architectural or other limitations with respect to the presently described embodiments and/or the general disclosure.

Figure 3:
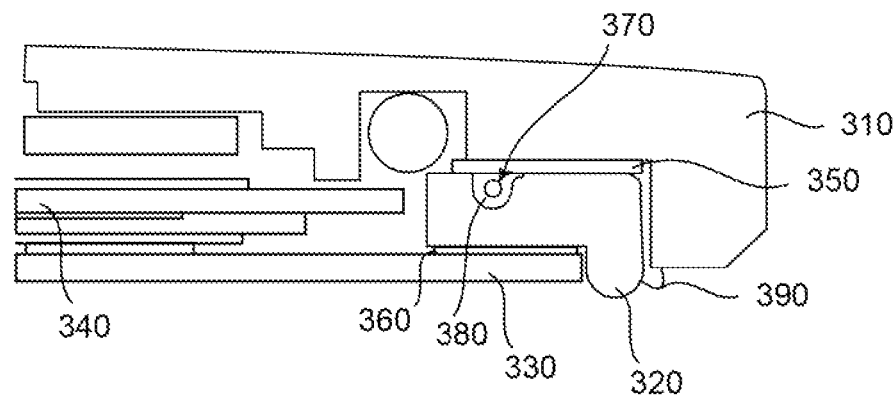
FIG. 3 illustrates a partial cross-sectional view of a display along line A-A of FIG. 2, according to one embodiment.

FIG. 3 illustrates a partial cross-sectional view of the display 220 along line A-A of FIG. 2. Shown in the view are display panel 310, bezel 320, cover screen 330 and rendering electronics 340. The bezel 320, cover screen 330 and rendering electronics 340 form the LCD screen 230 (FIG. 2), where the cover screen 330 and rendering electronics 340 can represent a TFT open cell in one or more embodiments. The LCD screen 230 is fastened onto the display panel 310 by an adhesive 350, such as a very high bond (VHB) double-sided tape, to form a panel assembly. In at least one embodiment, the display panel 310 represents the backlit unit of the display 220. Cover screen 330 is bonded to the panel assembly by being adhesively bonded to the bezel 320 by an adhesive 360 such as a pressure sensitive adhesive (PSA).

Figure 4:
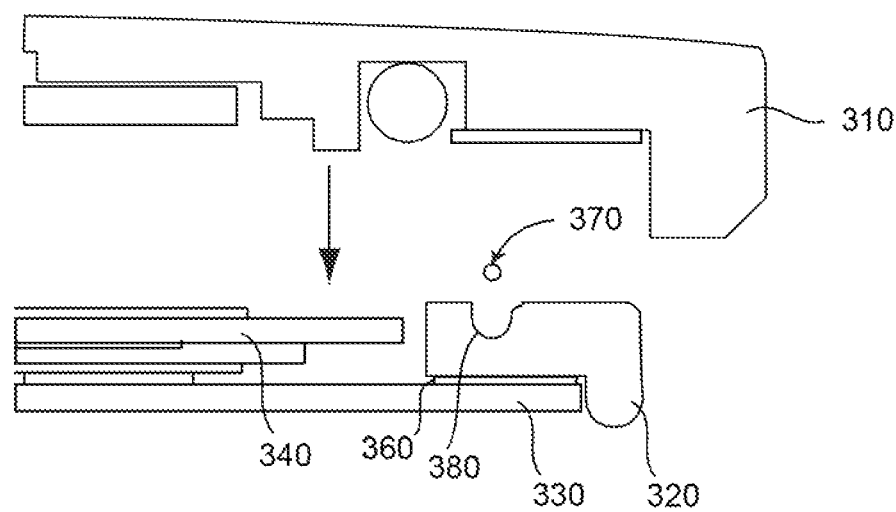
FIG. 4 depicts the display after an adhesive bonding a liquid crystal display (LCD) screen to a display panel has been cut through by a shearing mechanism and the LCD screen separated from the display panel, according to one embodiment.

Also shown in FIG. 3 is a shearing mechanism 370 disposed within a channel 380. Shearing mechanism 370 is used to cut through the bond formed by the adhesive 350 to unfasten the display panel 310 from the LCD screen 230 (FIG. 2). As is explained further below, this is facilitated by a seam 390 provided between the display panel 310 and the LCD screen 230. Once the LCD screen 230 is unfastened from the display panel 310, the two components can be separated from each other as shown in FIG. 4. Because all components are the same as presented in FIG. 3, no separate description of FIG. 4 is presented, and FIG. 4 is provided to simply illustrate the separation of the two components. Note that in the present embodiment, shearing mechanism 370 is a high tensile string or cable. However, shearing mechanism 370 is not restricted to being a high tensile string or cable, rather, it can be anything that can cut through the bond used to fasten the display panel 310 onto the LCD screen 230, including but not limited to a steel or Teflon cable, a wire, etc., so long as the shearing mechanism 370 is of a high tensile strength so as not to be broken when being utilized.

Figure 5:
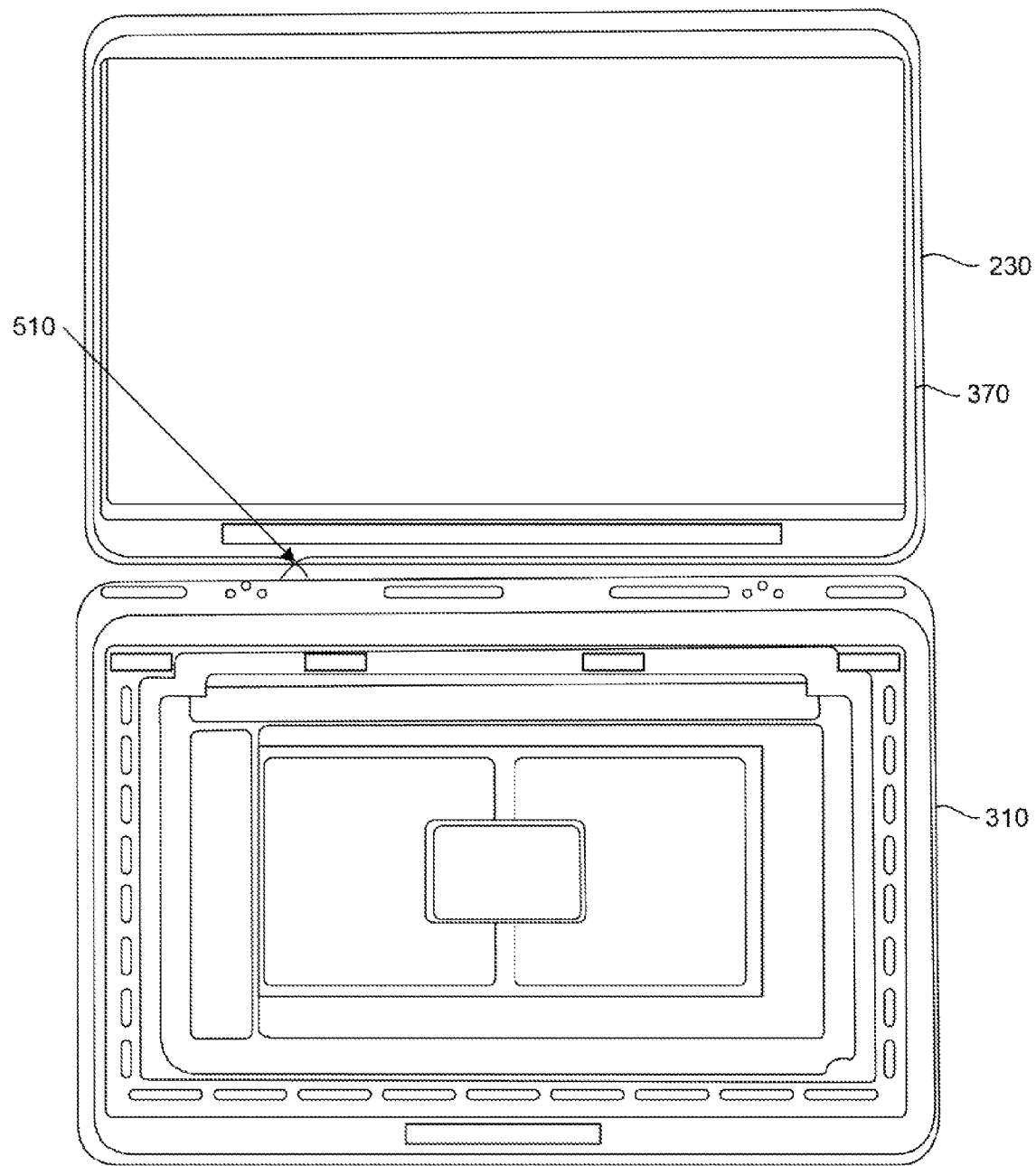
FIG. 5 depicts the LCD screen separated from the display panel, according to one or more embodiments.

FIG. 5 depicts the LCD screen 230 from display 220 of ultrathin computing device 200 (FIG. 2) separated from the display panel 310. In the figure, the shearing mechanism 370 is shown located around a peripheral edge of the LCD screen 230. Both ends of the shearing mechanism 370 exit out of the LCD screen 230 and the channel 380 at an exit location 510. However, although the two ends of the shearing mechanism 370 are shown exiting at one exit location, the two ends of the shearing mechanism 370 may exit at different exit locations. Thus, the use of only one exit location 510 is for illustrative purposes only.

Figure 6:
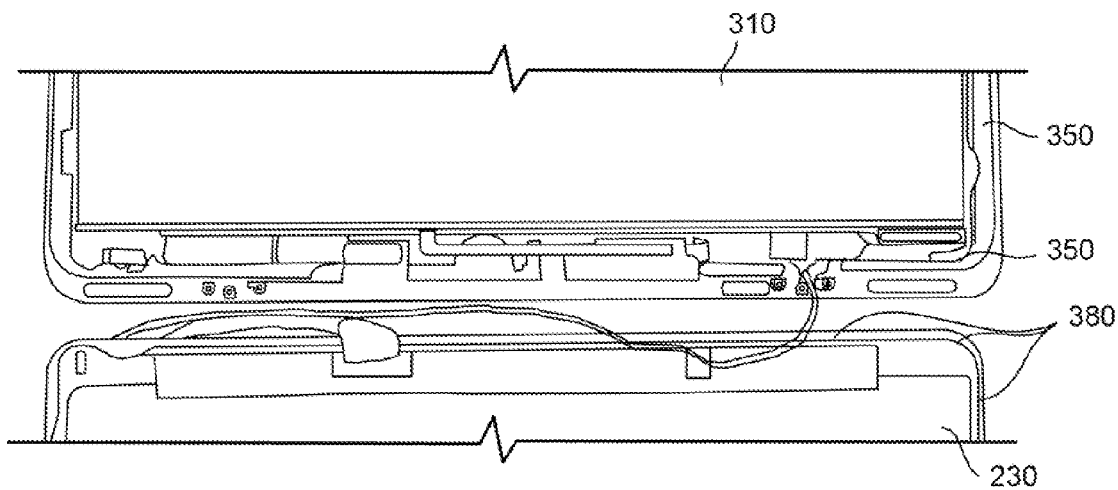
FIG. 6 displays a clearer view of a channel and the adhesive, in accordance with one or more embodiments.

FIG. 6 displays a view of the channel 380 and the adhesive 350. To better understand this particular embodiment, the channel 380 is shown on the LCD screen 230 and the adhesive 350 is shown on the display panel 310. But note that both the channel 380 and the adhesive 350 may be located on either the display panel 310 or on the LCD screen 230. Consequently, the showing of the channel 380 on the LCD screen 230 and the adhesive 350 on the display panel 310 is for illustrative purposes only.

Figure 7:
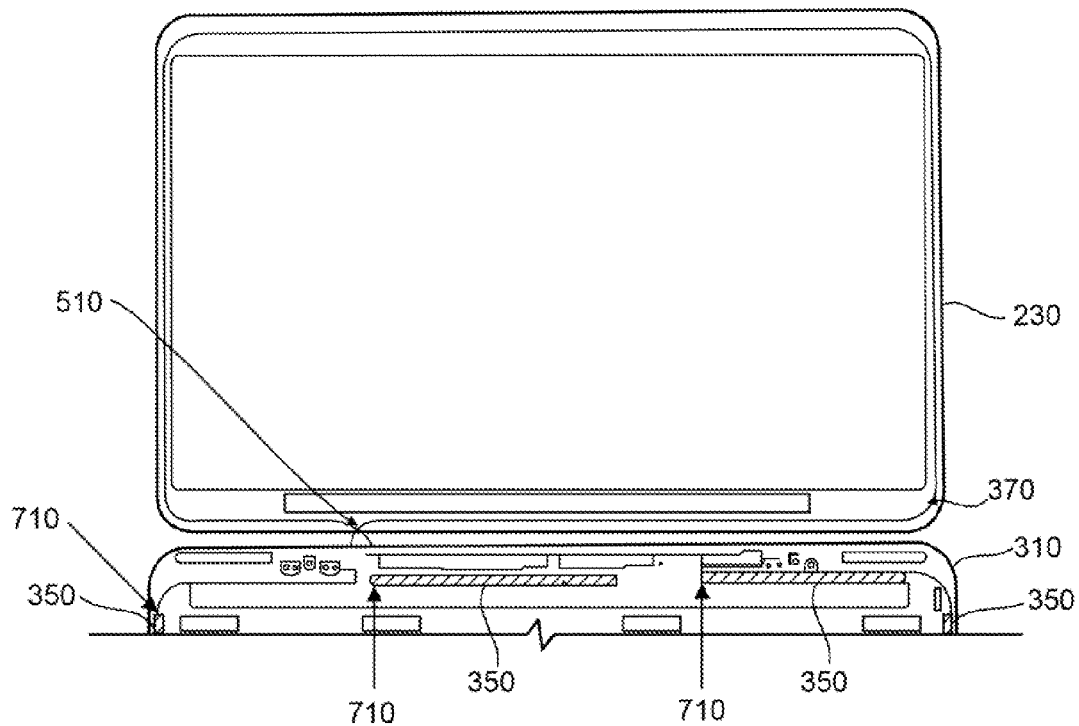
FIG. 7 presents another view of the shearing mechanism and the adhesive, in accordance with one or more embodiments.

FIG. 7 presents a view of the shearing mechanism 370 and the adhesive 350 on opposing panels. As shown from the figure, the adhesive 350 is applied at a plurality of adhesive application locations (beginning as indicated by the arrows 710) on the display panel 310. The adhesive application locations 710 are closer toward the peripheral edge of the LCD screen 230 than the shearing mechanism 370. Thus when applied, the adhesive 350 is located between the shearing mechanism 370 and the peripheral edge of the LCD screen 230. This configuration allows for the shearing mechanism 370 to cut through the adhesive 350 when pulled out of the display 220 (FIG. 2). For example, when the end of the shearing mechanism 370 that comes from the right side of the LCD screen 230 is pulled to the right, the shearing mechanism 370 will cut through the adhesive 350 located on the right side of the display panel 310. Likewise, when the end of the shearing mechanism 370 that comes from the left side of the LCD screen 230 is pulled to the left, the shearing mechanism 370 will cut through the adhesive 350 located on the left side of the display panel 310. By continuing to pull on both ends or on either end of the shearing mechanism 370, the shearing mechanism 370 will continue to cut through the adhesive 350 until the entire LCD screen 230 becomes unfastened from the display panel 310. At that point, the LCD screen 230 and display panel 310 can be separated from each other as shown in FIGS. 4 and 5.

Note that although FIG. 7 shows a plurality of adhesive application locations 710 at which the adhesive 350 is applied, this presentation is only one possible implementation. For example, in some cases the adhesive 350 may be applied at one adhesive application location 710 disposed around the entire peripheral edge of the display panel 310. Further, it is not necessary for both ends of the shearing mechanism 370 to be pulled to unfasten the LCD screen 230 from the display panel 310, as the LCD screen 230 can be unfastened by pulling on only one end. Regardless of whether one or both ends of the shearing mechanism 370 are pulled to unfasten the LCD screen 230 from the display panel 310, the process involves applying a sufficient pulling force on the end being pulled. The pulling force can be applied in at least one of an upward direction relative to the LCD screen 230 and a lateral direction towards an outside edge of the LCD screen 230 in order to unfasten the LCD screen 230 from the display panel 310. Thus, the embodiment as shown and described is for illustrative purposes only.

Figure 8:
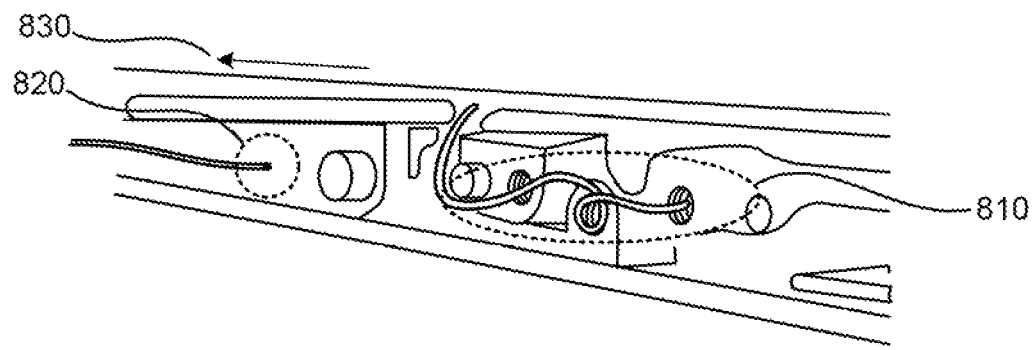
FIG. 8 illustrates a bottom view of the display, according to one or more embodiments.

FIG. 8 illustrates a bottom view of the display 220 and is described with reference to the components presented in the previous figures. Illustrated in FIG. 8 are arrow 830, circle 820, and oval 810. Arrow 830 illustrates a direction in which an end of the shearing mechanism 370 exiting the display 220 at an exit location denoted by circle 820 may be pulled to unfasten the LCD screen 230 from the display panel 310. Within oval 810 is shown another end of the shearing mechanism 370. The end within the oval 810 displays a manner of organizing the ends of the shearing mechanism 370 at the bottom of the display 220 such that the ends are properly stored under a snap-on bezel or frame (not shown) during normal operation of the ultrathin computing device 200. However, it is appreciated that in alternate implementations, the ends of the shearing mechanism can be located on one of the first panel or the second panel.

After the LCD screen 230 is separated from the display panel 310, the parts within the display 220 become accessible. If a part malfunctioned or was broken, it can now be fixed or replaced. After fixing or replacing the part, the shearing mechanism 370 may be put back in its original location before re-bonding the display screen 230 back onto the display panel 310. Putting the shearing mechanism 370 back in its original location allows the shearing mechanism 370 to be used again to cut through the new bond should the LCD screen 230 need to be separated from the display panel 310 once again.

Figure 9:
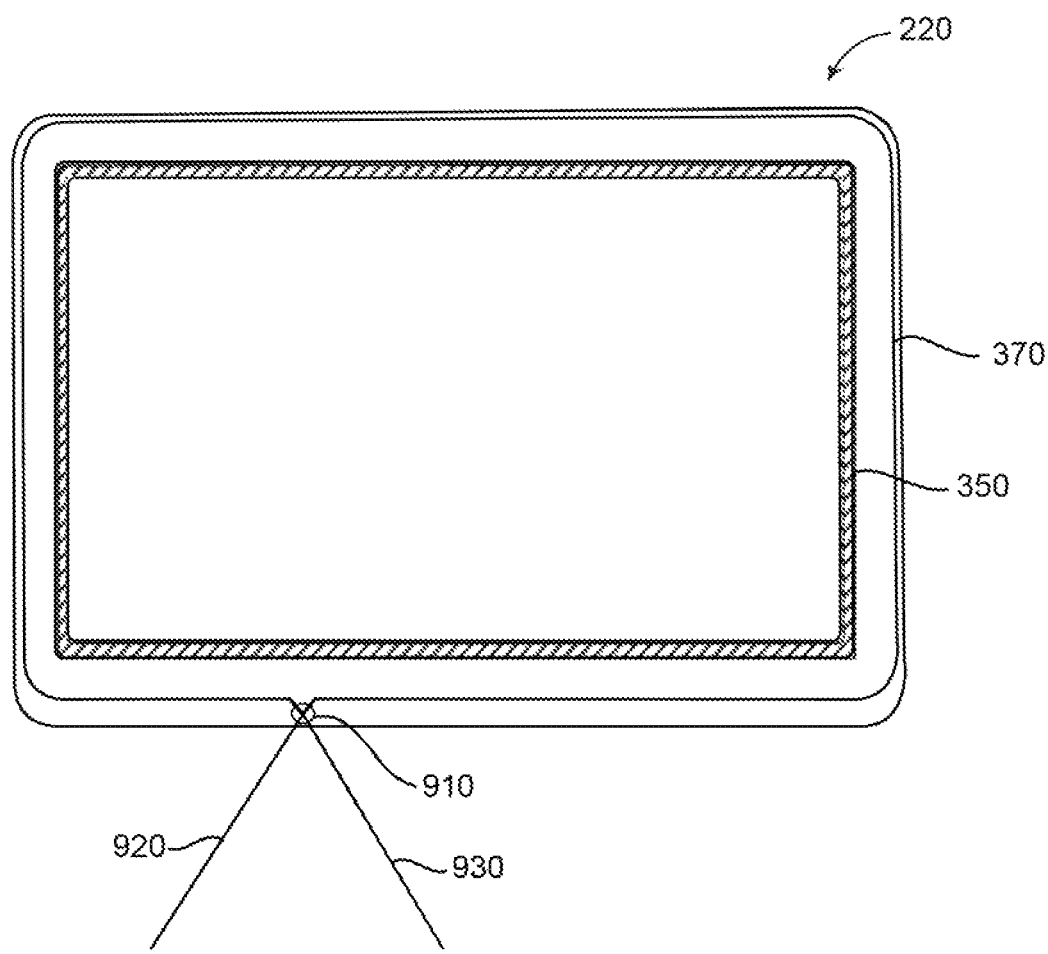
FIG. 9 illustrates an alternate embodiment of a display device configured with a shearing mechanism for separating the LCD screen from the display panel.

FIG. 9 illustrates an alternate embodiment to the embodiment shown in FIGS. 3-8 and is described with reference to the components previously introduced in those figures. In the alternate embodiment, the shearing mechanism 370 is placed closer to the edge of the LCD screen 230 than the location of the adhesive 350. Consequently, the shearing mechanism 370 is located between the adhesive 350 and the peripheral edge of the LCD screen 230. Further, the figure does not include seam 390 shown in FIG. 3. This configuration allows either end or both ends of the shearing mechanism 370 to be pulled in any direction out of the display 220, and the shearing mechanism 370 cuts through the adhesive 350 from the outside to the inside as the perimeter of the shearing mechanism 370 decreases within the assembly. By contrast, in the configuration of the previous embodiment, the adhesive 350 is located between the shearing mechanism 370 and the peripheral edge of the LCD screen 230, and the left and/or right end of the shearing mechanism 370 needs to be pulled through seam 390 from the left and/or the right, respectively, of the display 220 for the shearing mechanism 370 to cut through the adhesive 350.

Figure 10:
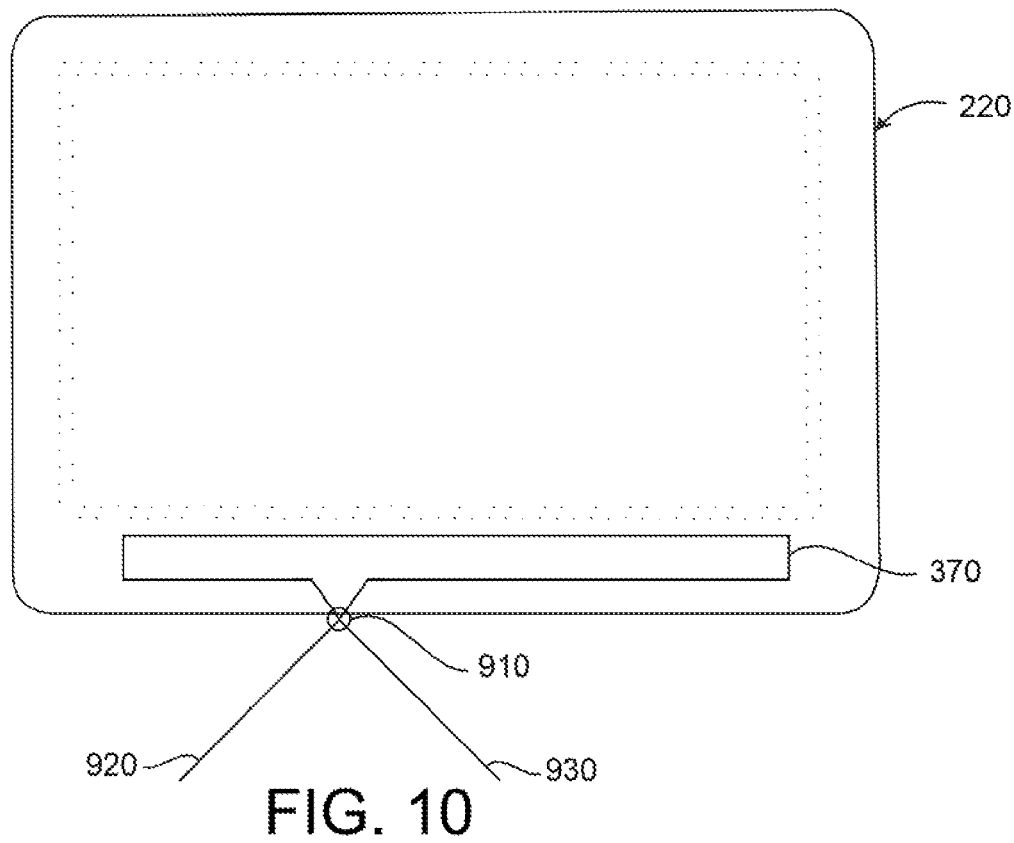
FIG. 10 illustrates the display after the bond between the display screen and the display panel of the display has been cut through by the shearing mechanism, according to one or more embodiments.

Particularly, FIG. 9 depicts two ends 920 and 930 of the shearing mechanism 370 exiting the display 220 through an exit opening 910. Also shown in the figure is adhesive 350 applied at one adhesive application location disposed around the entire peripheral edge of the display panel 310. Note, however, that as in FIG. 7, a plurality of discrete adhesive application locations at which the adhesive 350 is applied may be used in FIG. 9 as well. When either or both ends 920 and 930 of the shearing mechanism 370 are pulled out of the display 220, the shearing mechanism 370 will cut through the adhesive 370. After a sufficient length of the shearing mechanism 370 has been pulled out of the display 220, the entire adhesive 350 will be cut through by the shearing mechanism 370 as shown in FIG. 10. For illustrative purposes, the remains of the adhesive 350 in FIG. 10 is shown only as a dotted outline where the adhesive 350 was previously visible in FIG. 9). This illustrates that the adhesive bond between the display screen 230 and the display panel 310 has been cut through by the shearing mechanism 370.

One aspect of this alternate embodiment involves an appreciation that the LCD screen 230 (FIG. 2) may contain sensitive components, which may become in contact with the shearing mechanism 370 while the shearing mechanism 370 is being pulled to cut through the adhesive 350. According to one embodiment, a very thin plastic or metal shield (not shown) may be disposed between the display panel 310 and the LCD screen 230. A space or conduit may be formed between the thin plastic or metal shield and the display panel 310 through which the shearing mechanism 370 may travel as the shearing mechanism 370 is being pulled to cut through the adhesive 350.

Figure 11:
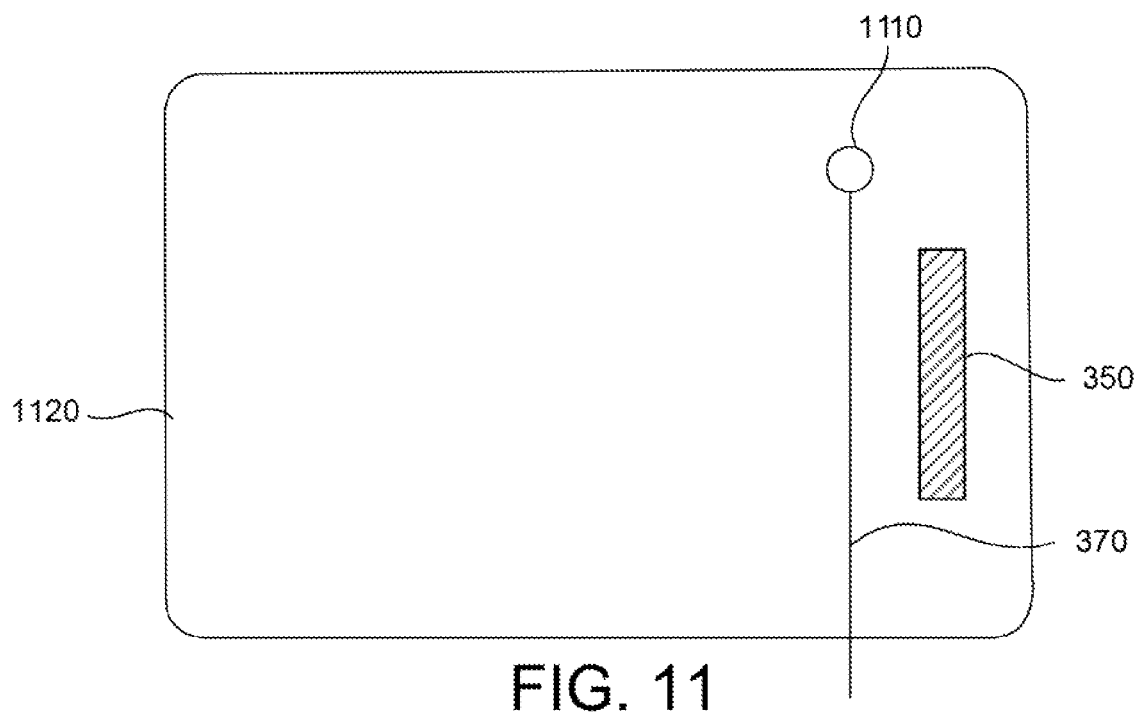
FIG. 11 depicts a second alternate embodiment of a display device configured with a shearing mechanism for separating the LCD screen from the display panel.
Figure 12:
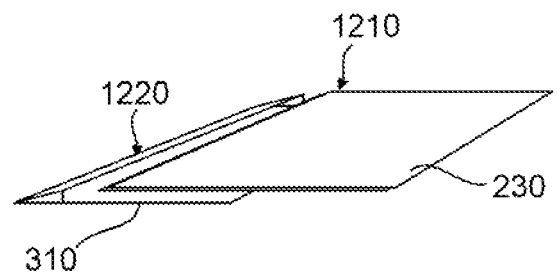
FIG. 12 depicts a particular example of an interlocking mechanism, in accordance with one embodiment.

FIG. 11 depicts a second alternate embodiment of the implementation of a shearing mechanism to enable post assembly separation of the display panel 310 and LCD screen 230. In this embodiment, a first side 1120 of the LCD screen 230 may be fastened to the display panel 310 by an interlocking mechanism shown in FIG. 12. As provided by FIG. 12, the interlocking mechanism may include an edge 1210 of the LCD screen 230 being inserted into a receiving edge 1220 of the display panel 310, which may be in the shape of an elongated hook or an open triangle shape, for example. The other side of the LCD screen 230 may be fastened to the display panel 310 by adhesive 350. Also in that embodiment, one end of the shearing mechanism 370 may be attached to an immovable structure 1110 on the display panel 310. The other end of the shearing mechanism 370 is free to exit the display 220 through seam 390 (see FIG. 3). Pulling the free end of the shearing mechanism 370 through the seam 390 to the right of the display 220 will enable the shearing mechanism 370 to cut through the adhesive 350 to unfasten that side of the LCD screen 230 from the display panel 310. Once unfastened from the display panel 310, the other side of the LCD screen 230 may easily be unlocked from the interlocking mechanism of FIG. 12. In cases where the shearing mechanism 370 may become in contact with sensitive components of the LCD screen 230 while cutting through the adhesive 350, the thin plastic or metal shield may be used as disclosed above.

Figure 13:
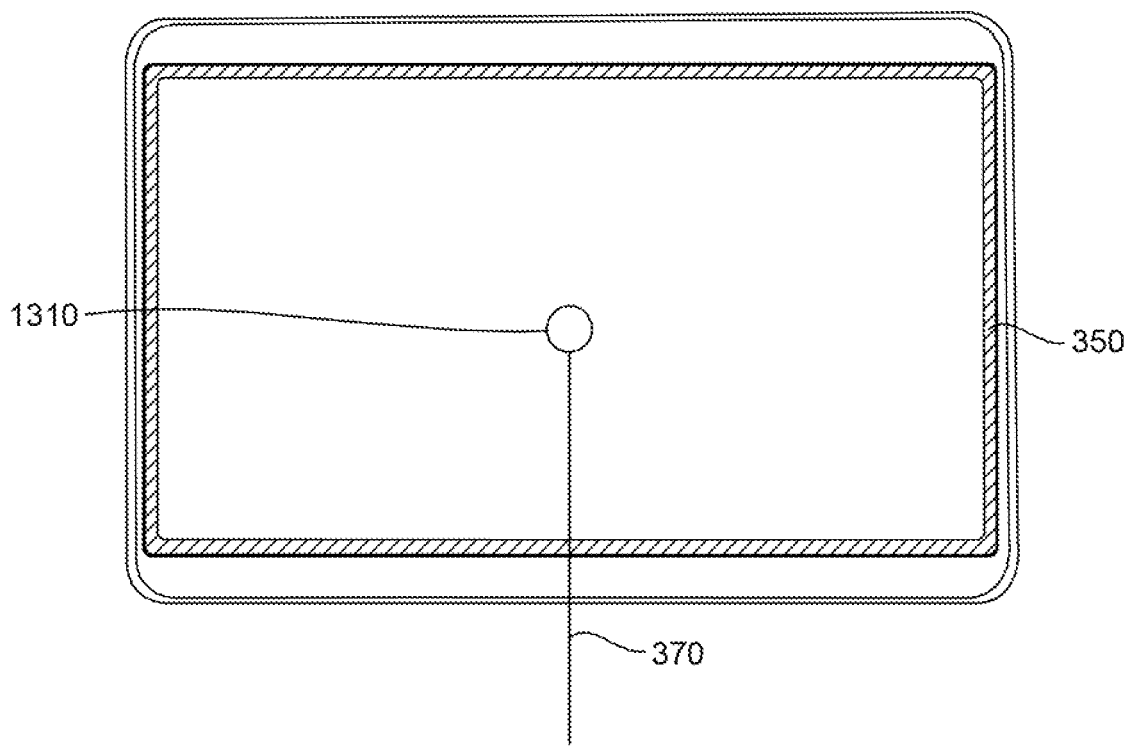
FIG. 13 displays yet another alternative embodiment of a display device configured with a shearing mechanism for separating the LCD screen from the display panel.

FIG. 13 displays yet another alternative embodiment, which is described with reference to the previously introduced components of the display assembly. In this embodiment, one end of the shearing mechanism 370 may be attached to an immovable structure 1310 located at the center of the display panel 310. The other end of the shearing mechanism 370, which may exit the display 220 through seam 390, may be pulled in a clockwise or counterclockwise direction to cut through the adhesive 350 to unfasten the LCD screen 230 from the display panel 310. The immovable structure 1310 may be located anywhere on the display panel 310. For example, immovable structure 1310 may be located at the bottom center or the top center or the left center of the display panel 310. However, the location of the immovable structure 1310 takes into consideration that the shearing mechanism 370 has to be consistently long enough to extend through the seam 390 as the shearing mechanism is being pulled through the seam 390 to cut through the adhesive 350 (see FIG. 3). Again, the thin plastic or metal shield may be used as disclosed above (in the descriptions of FIGS. 9 and 10) for cases where the shearing mechanism 370 may otherwise come into contact with sensitive components of the LCD screen 230 while being utilized to cut through the adhesive 350.

Figure 14:
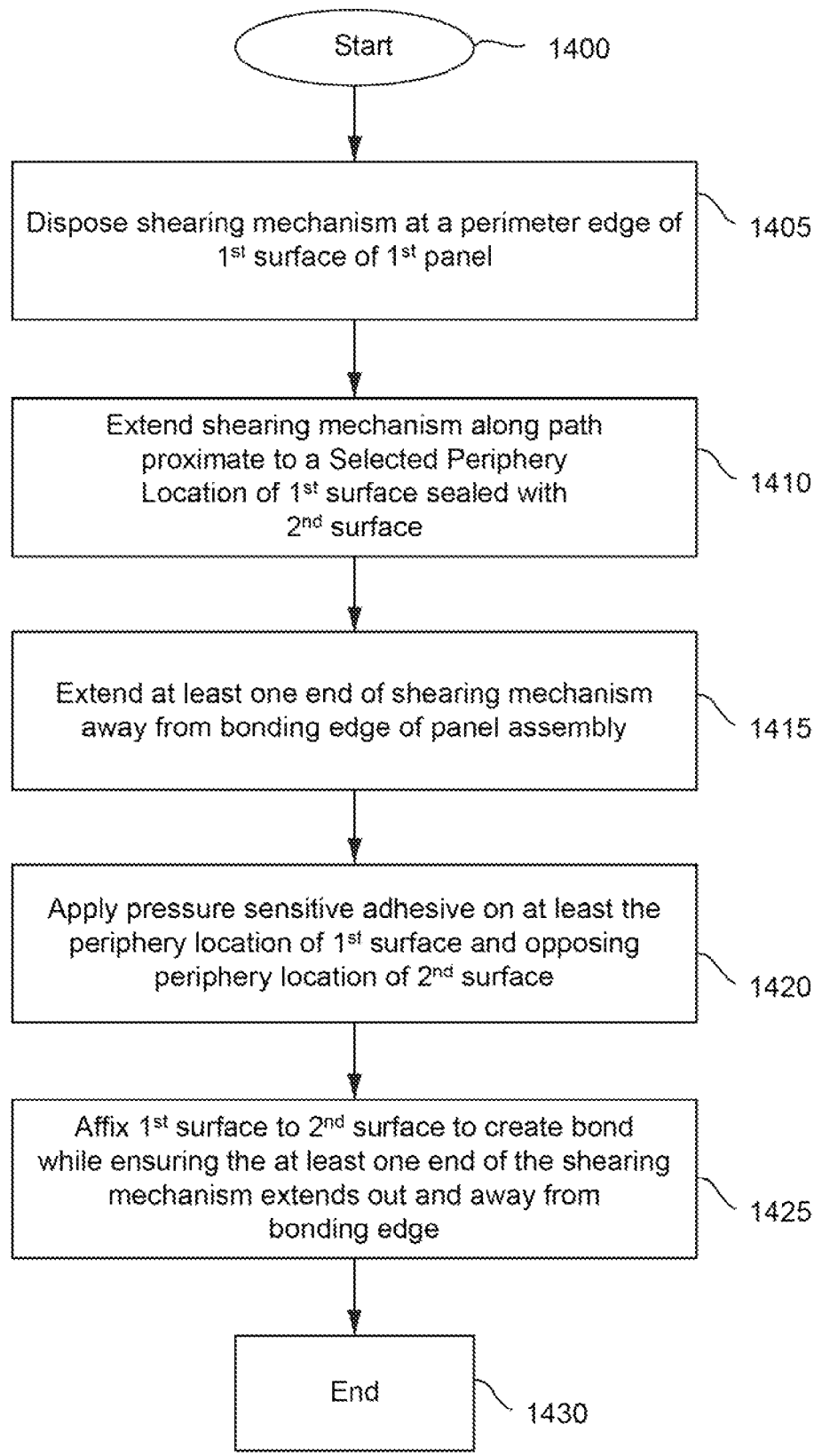
FIG. 14 is a flow chart illustrating a method by which a display system can be assembled with a shearing mechanism that may be utilized to cut through a bond or seal between a first part and a second part of a display system when separating the first part from the second part, according to one or more embodiments.

FIG. 14 is a flow chart illustrating a process by which a shearing mechanism may be used to cut through a bond between a first panel and a second panel of an information handling system display when separating the first panel from the second panel. The process starts with the display being assembled (block 1400). An elongated shearing mechanism is disposed at a perimeter edge of a first surface of the first panel (block 1405). The shearing mechanism is disposed such that the shearing mechanism extends along a path that is proximate to a selected periphery location of the first surface at which the first surface is sealed together with a second surface of the second panel to create a panel assembly (block 1410). At least one end of the shearing mechanism is extended away from a bonding edge of the panel assembly (block 1415). A pressure-sensitive adhesive that is used to bond the first panel to the second panel is disposed on at least one of (1) the periphery location of the first surface and (2) an opposing periphery location of the second surface (block 1420). The first surface may then be affixed onto the second surface via the adhesive to create the panel assembly having an adhesive bond between the first surface and the second surface, with the at least one end of the shearing mechanism extending from the bonding edge (block 1425). The process ends once the panels are separated from each other (block 1430).

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of enabling post-assembly separation of a first panel and a second panel of a direct bonding panel assembly, the method comprising:

disposing an elongated shearing mechanism at a perimeter edge of a first surface of the first panel, wherein the shearing mechanism extends along a path that is proximate to a selected periphery location of the first surface at which the first surface is sealed together with a second surface of the second panel to create the panel assembly and wherein the shearing mechanism includes at least one end that extends away from a bonding edge of the panel assembly;

disposing an adhesive on at least one of (1) the periphery location of the first surface and (2) an opposing periphery location of the second surface;

affixing the first surface to the second surface via the adhesive to create the panel assembly having an adhesive bond between the first surface and the second surface, with the at least one end of the shearing mechanism extending from the bonding edge;

wherein the adhesive bond can be broken by applying sufficient pulling force on the at least one end of the shearing mechanism in at least one of an upward direction relative to the first panel of the panel assembly and a lateral direction towards an outside edge of the panel assembly.

2. The method of claim 1, further comprising:

affixing an opposing end of the shearing mechanism to an immovable structure within the first panel, wherein only one end extends outward from the bonding edge, and the affixed end allows the one end to be utilized to break the adhesive bond along the entire perimeter of the bonding edge.

3. The method of claim 1, wherein the shearing mechanism has a first end and a second end exiting an opening in the panel assembly, and wherein the adhesive bond can be broken by simultaneously applying sufficient pulling force on each of the first end and the second end.

4. The method of claim 1, wherein the path of the shearing mechanism is inside of the selected periphery location of the first surface at which the first surface is sealed together.

5. The method of claim 1, wherein the path of the shearing mechanism is outside of the selected periphery location of the first surface at which the first surface is sealed together.

6. The method of claim 1, further comprising:

providing a channel within the first panel having a volume dimension that accommodates placement of the shearing mechanism therein, wherein the channel extends around the perimeter of the first panel to create the path of the shearing mechanism.

7. The method of claim 1, wherein the adhesive is a pressure-sensitive adhesive and is one of an adhesive glue and a double-sided very high bond (VHB) tape.

8. The method of claim 1, wherein the panel assembly is one of a display of an ultrathin computing device, the second panel of the panel assembly includes a liquid crystal display screen and rendering electronics, and the first panel includes a display panel for sealing the rendering electronics within the display.

9. The method of claim 1, further comprising attaching a third panel covering an area of the first panel at which the shearing mechanism extends from the bonding edge, wherein the at least one end of the shearing mechanism is disposed behind the third panel and is accessible when the third panel is removed.

10. The method of claim 1, wherein the elongated shearing mechanism has high tensile strength and is one of a string and a cable.

11. An information handling system having a display device comprising:

a first panel having a first surface;

a second panel having a second surface that is affixed to the first surface via an adhesive to create a panel assembly having an adhesive bond between the first surface and the second surface at a bonding edge along the periphery of each respective surface, wherein the adhesive is disposed on at least one of (1) the periphery location of the first surface and (2) an opposing periphery location of the second surface;

an elongated shearing mechanism having a first end and a second end and disposed proximate to a perimeter edge of a first surface of the first panel, wherein the shearing mechanism extends along a path that is proximate to a selected periphery location of the first surface at which the first surface is sealed together with the second surface of the second panel to create the display device, and wherein the shearing mechanism includes at least one end that extends away from the bonding edge of the display device;

wherein the adhesive bond can be broken by applying sufficient pulling force on the at least one end of the shearing mechanism in at least one of an upward direction relative to the first panel of the panel assembly and a lateral direction towards an outside edge of the panel assembly.

12. The information handling system of claim 11, wherein an opposing end of the shearing mechanism is affixed to an immovable structure within the first panel, wherein only one end extends outward from the bonding edge, and the affixed end allows the one end to be utilized to break the adhesive bond along the entire perimeter of the bonding edge.

13. The information handling system of claim 11, wherein the shearing mechanism has a first end and a second end exiting an opening in the panel assembly, and wherein the adhesive bond can be broken by simultaneously applying sufficient pulling force on each of the first end and the second end.

14. The information handling system of claim 11, wherein the path of the shearing mechanism is inside of the selected periphery location of the first surface at which the first surface and the second surface are sealed together.

15. The information handling system of claim 11, wherein the path of the shearing mechanism is outside of the selected periphery location of the first surface at which the first surface and the second surface are sealed together.

16. The information handling system of claim 11, wherein the display device further comprises a channel within the first panel having a volume dimension that accommodates placement of the shearing mechanism therein, wherein the channel extends around the perimeter of the first panel to create the path of the shearing mechanism.

17. The information handling system of claim 11, wherein the panel assembly is one of a display and an ultra-book, the second panel of the panel assembly includes a display screen and rendering electronics, and the first panel includes a display panel for sealing the rendering electronics within the display.

18. The information handling system of claim 11, wherein the display device further comprises a third panel covering an area of the first panel at which the shearing mechanism extends from the bonding edge, wherein the at least one end of the shearing mechanism is disposed behind the third panel and is accessible when the third panel is removed.

19. The information handling system of claim 11, wherein the first panel of the display device includes a display screen and rendering electronics and the second panel includes a display panel for sealing the rendering electronics within the display.

20. The information handling system of claim 19, further comprising one or more input/output devices and ports coupled to the display device.

\* \* \* \* \*